(12) United States Patent
Yokota et al.

(10) Patent No.: US 7,723,276 B2
(45) Date of Patent: *May 25, 2010

(54) OIL FOR CUTTING AND GRINDING BY ULTRA LOW VOLUME OIL FEED SYSTEM AND FOR SLIDING SURFACE AND METHOD FOR CUTTING AND GRINDING BY ULTRA LOW VOLUME FEED SYSTEM USING THE OIL

(75) Inventors: Hideo Yokota, Yokohama (JP); Masanori Ibi, Niigata (JP); Satoshi Suda, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 320 days.

This patent is subject to a terminal disclaimer.

(21) Appl. No.: 10/473,862

(22) PCT Filed: Apr. 5, 2002

(86) PCT No.: PCT/JP02/03443

§ 371 (c)(1),
(2), (4) Date: Oct. 3, 2003

(87) PCT Pub. No.: WO02/083823

PCT Pub. Date: Oct. 24, 2002

(65) Prior Publication Data

US 2004/0116308 A1  Jun. 17, 2004

(30) Foreign Application Priority Data

Apr. 6, 2001 (JP) ............................... 2001-109143

(51) Int. Cl.
C10M 105/34 (2006.01)
C10M 105/38 (2006.01)
C10M 137/02 (2006.01)

(52) U.S. Cl. ................. 508/463; 508/433; 508/441; 508/465; 508/485

(58) Field of Classification Search ............ 508/459, 508/463, 465, 485
See application file for complete search history.

(56) References Cited

U.S. PATENT DOCUMENTS

| 4,178,260 A | * | 12/1979 | Cook et al. ................. 508/162 |
| 4,346,148 A | * | 8/1982 | Jahnke ........................ 428/461 |
| 4,601,840 A | * | 7/1986 | Zehler et al. ................ 508/481 |
| 5,698,502 A | * | 12/1997 | Pafford et al. .............. 508/485 |
| 6,165,053 A | | 12/2000 | Yokokawa et al. |
| 6,305,183 B1 | * | 10/2001 | Mukai et al. .................. 62/376 |
| 6,858,569 B2 | * | 2/2005 | Yokota et al. ............... 508/485 |
| 2004/0116309 A1 | * | 6/2004 | Yokota et al. ............... 508/463 |

FOREIGN PATENT DOCUMENTS

| JP | 09111278 A | * | 4/1997 |
| JP | 10-086036 | | 4/1998 |
| JP | 11-246881 | | 9/1999 |
| JP | 2000-073078 | | 3/2000 |
| JP | 2000-073079 | | 3/2000 |
| JP | 2000-273078 | | 3/2000 |
| JP | 2000-110711 | | 4/2000 |
| JP | 2000-126984 | | 5/2000 |
| JP | 2000-226592 | | 8/2000 |
| JP | 2000-0256688 | | 9/2000 |
| JP | 2000-345180 | | 12/2000 |
| JP | 2001-062668 | | 3/2001 |
| JP | 2001-192685 | | 7/2001 |
| JP | 2001-192686 | | 7/2001 |
| JP | 2001-192690 | | 7/2001 |
| JP | 2001-192691 | | 7/2001 |
| JP | 2002-256688 | | 9/2002 |
| WO | WO 01/30945 A1 | | 5/2001 |

OTHER PUBLICATIONS

Machine Translation of JP 2000-073078, Mar. 7, 2000.*
Machine translation of JP 09-111278, Apr. 28, 1997.*
Full English-language translation of JP 09-111278, Apr. 28, 1997.*
Machine Translation of JP 2000-073079 A, Mar. 7, 2000.*
Hideo Yokota et al., "Cutting by Feeding System of Cutting Oil for Minimal Quantity Lubrication," Nisseki Technical Review, vol. 41, No. 1, pp. 12-16 (1999), Partial English Translation.
Shigeru Suzuki, "Feeding System of Cutting Oil for Minimal Quantity Lubrication, Ecosaver, Ecotool," vol. 47, No. 5, pp. 43-46 (1999), Partial English Translation.
Ichiro Inasaki et al., "Cutting with Minimal Quantity Lubrication," IMS Collection Papers of Research Presentation, pp. 110-113 (Jul. 14-15, 1999), English Summary.
English language esp@cenet Abstract for JP 10-086036, Apr. 7, 1998.
English language esp@cenet Abstract for JP 11-246881, Sep. 14, 1999.
English language Derwent Abstract for JP 2000-073078, Mar. 7, 2000.
English language Derwent Abstract for JP 2000-073079, Mar. 7, 2000.
English language esp@cenet Abstract for JP 2000-256688, Sep. 19, 2000.

(Continued)

Primary Examiner—Vickey Nerangis
(74) Attorney, Agent, or Firm—Finnegan, Henderson, Farabow, Garrett & Dunner, LLP

(57) ABSTRACT

An oil for cutting and grinding by minimal quantity lubrication system and for sliding surface according to the present invention comprises an ester, and is used as a lubricating oil for cutting and grinding suitable for a cutting and grinding method by minimal quantity lubrication system, and also used as a lubricating oil for sliding surface.

7 Claims, 2 Drawing Sheets

OTHER PUBLICATIONS

English language Derwent Abstract for JP 2000-226592, Aug. 15, 2000.
English language Derwent Abstract for JP 2000-345180, Dec. 12, 2000.
English language esp@cenet Abstract for JP Patent No. 3860711 (Publication No. JP 2001-192685), Jul. 17, 2001.
English language esp@cenet Abstract for JP Patent No. 3860712 (Publication No. JP 2001-192686), Jul. 17, 2001.
English language esp@cenet Abstract for JP Patent No. 3905292 (Publication No. JP 2001-192690), Jul. 17, 2001.
English language esp@cenet Abstract for JP Patent No. 3905293 (Publication No. JP 2001-192691), Jul. 17, 2001.

* cited by examiner

OIL FOR CUTTING AND GRINDING BY ULTRA LOW VOLUME OIL FEED SYSTEM AND FOR SLIDING SURFACE AND METHOD FOR CUTTING AND GRINDING BY ULTRA LOW VOLUME FEED SYSTEM USING THE OIL

TECHNICAL FIELD

The present invention relates to an oil for cutting and grinding by minimal quantity lubrication system and for sliding surface and a method for cutting and grinding by minimal quantity lubrication system using the oil, and more particularly, relates to a cutting and grinding method of workpiece to be machined while supplying minimal quantity oil together with a compressed fluid to a spot of machining and the oil to be used for the cutting and grinding operation by minimal quantity lubrication system and for the sliding surface.

BACKGROUND ART

Various cutting or grinding oils are generally used to improve the productivity of machining which extends the life of tools for machining such as drills, endmills, turning tools and grinding wheels, and improves the roughness of machined surface and the machining efficiency thereby.

Oils for cutting and grinding are roughly classified into two types; water-soluble ones which are used after diluting the surface-active agent and lubricant component comprised therein with water, and water-insoluble ones which comprise a mineral oil as a main component and are used as it is. In conventional cutting and grinding operations, relatively large amounts of cutting or grinding oil are supplied to a spot of machining in the case of using either type.

The most basic and important functions of oils for cutting and grinding are lubricating and cooling function. Generally speaking, water-insoluble oils for cutting and grinding are superior in lubricity, while water-soluble ones are superior in cooling properties. Since the cooling properties of the water-insoluble oils for cutting and grinding are inferior to that of the water-soluble ones, it is necessary to supply a large amount of water-insoluble cutting or grinding oil ranging from several liters to several tens of liters per a minute.

From the different point of view, oils for cutting and grinding, which are effective for improving machining efficiency, have some drawbacks. The typical examples of such drawbacks are environmental problems. Whether the oil is water-soluble or water-insoluble, oil tends to be gradually deteriorated during the use thereof and finally becomes unusable for further use. For instance, in the case of water-soluble oil, the growth of microorganisms results in the separation of the components or the deterioration of the environmental sanitation due to the decrease of liquid stability and then the oil falls into disuse. In the case of water-insoluble oil, the acid components corrode the metallic parts or significantly change the viscosity of the oil due to the progress of oxidation, and then the oil also falls into disuse. Furthermore, the oil is consumed by attaching to metal chips and becomes wastes.

In such a case, the deteriorated oil is disposed and replaced with a fresh oil. The oil disposed as wastes requires various treatments so as not to adversely affect the environment. For instance, oils for cutting and grinding which have been developed under the priority to improve working efficiency use a large amount of chlorine-containing compounds, which may generate hazardous dioxin upon incineration. Therefore, the removal of such compounds is inevitable. Consequently, cutting or grinding oils comprising chlorine-free compounds have been developed. Even though the oils for cutting and grinding do not comprise such hazardous compounds, environmental problems may arise due to a large amount of waste disposal. The water-soluble oils require complicated and expensive treatment of the oils to avoid the potential pollution of the surrounding water atmosphere.

Recently, in order to cope with the foregoing problems, it has been studied to cool a cutting or grinding portion by blowing a cold air instead of using cutting or grinding oils. In such a case, the other performance of oils for cutting and grinding, i.e., lubricity cannot be obtained.

Under such a background, there has been developed a method for cutting and grinding by a minimal quantity lubrication system. This system supplies minimal quantity oil ranging from about 1/100,000 to 1/1,000,000 of the normal quantity to a cutting or grinding spot of a workpiece together with a compressed fluid (for example, compressed air). This system can obtain a cooling effect with compressed air and can reduce the amount of wastes because of the minimization of oil use, which leads to improve the environmental influence caused by a large amount of waste disposal.

DISCLOSURE OF THE INVENTION

A method for cutting and grinding by minimal quantity lubrication system is preferably expected to provide a better finished surface of workepieces, reduction of the wear of tools, and high efficiency of cutting and grinding even though the volume of the oil feed is extremely low. Therefore, this method requires the higher performance of the oil for cutting and grinding. In addition, it is preferable that the oil should be biodegradable from the viewpoint of waste disposal and working environment.

Further, in the minimal quantity lubrication system, oil is supplied in the form of mist. If the oil is unstable, it deposits on the surface of the inside of machine tools, workpieces, tools and mist collectors, which causes stickiness phenomenon. This leads to the handling troubles and reduces working efficiency. Therefore, the low level of stickiness is a desirable property of the oil used for the minimal quantity lubrication system.

However, it is quite difficult to satisfy all of the aforementioned requirements with good balance even though the conventional oils are used as they are for the minimal quantity lubrication system. Thus, a development of new oil having an excellent property is desired for cutting and grinding.

On the other hand, a machine tool uses lubricating oil not only at the aforementioned machining portion but also on sliding face, in hydraulic units, bearings and gear portions.

Recently, in the viewpoints of space saving and energy saving for machine tools, the unification of lubricating oils is required to use for these machine tools. However, since each lubricating portion requires the different properties, it is difficult to cover all the lubricating portions by one type of oil.

For example, the lubricating oil for sliding surfaces requires the better friction properties such as low coefficient of friction on the sliding surface and high resistance to stick slip. Once a stick slip occurs on the sliding surface of such a machining table in a machine tool, the frictional vibration is directly transcribed to the workpiece resulting in the deterioration of machining accuracy or the vibration causes a problem of shorter tool life.

The present invention was executed in such circumstances and the object of the present invention is to provide a lubricating oil which is used as a suitable oil for cutting and grinding for minimal quantity lubrication system and also may be used for the lubrication of sliding surface, and the method of cutting and grinding by minimal quantity lubrication system using the same oil.

In order to achieve the aforementioned object, the present inventors have carried out an extensive investigation. As a result, it has been found that oils comprising an ester is predominant for cutting and grinding by minimal quantity lubrication system and for sliding surface. Thus the present inventors have completed the present invention.

Namely, the oil for cutting and grinding by minimal quantity lubrication system and for sliding surface of the present invention comprises ester.

The method for cutting and grinding by the minimal quantity lubrication system of the present invention is the one for cutting and grinding workpieces using minimal quantity lubrication system, and the method uses an oil for cutting and grinding and an oil for sliding surface of a machine tool which comprise a same ester.

In the method for cutting and grinding by minimal quantity lubrication system provided by the present invention, it is preferable that oil for cutting and grinding and oil for sliding surfaces are the same ones.

BEST MODES FOR CARRYING OUT THE INVENTION

Figure 1:
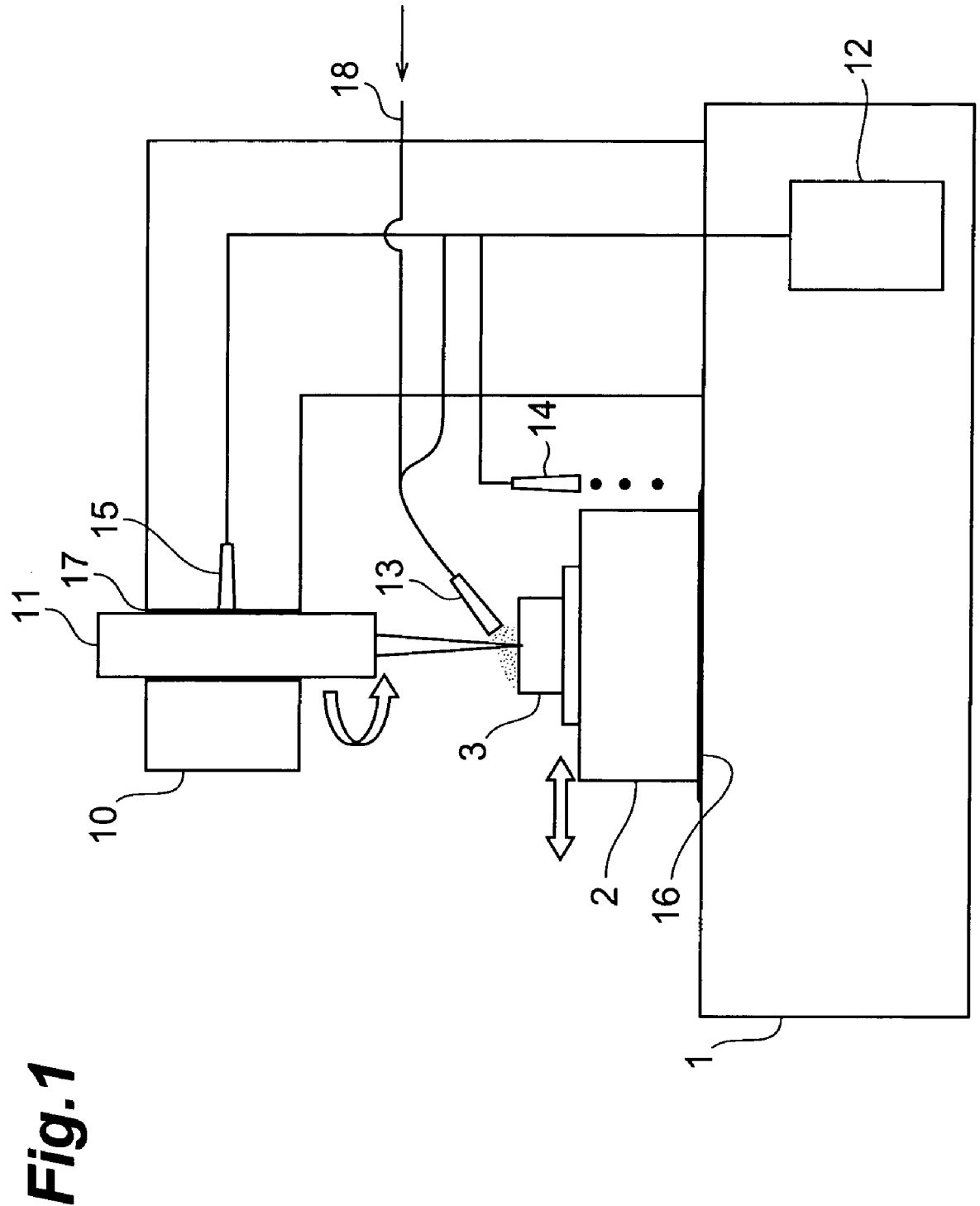
FIG. 1 shows an example of machine tool preferably used in the method for cutting and grinding by minimal quantity lubrication system of the present invention.

The preferred embodiments of the present invention will be described in detail below.

In the present invention, the oil for cutting and grinding by minimal quantity lubrication system and for sliding surface comprises an ester.

The term "a cutting and grinding by minimal quantity lubrication system" used herein denotes a cutting or grinding operation which is conducted while feeding an oil of minimal quantity such as 1/100,000 to 1/1,000,000 compared with the quantity of oil used for a normal cutting or grinding operation, together with a compressed fluid. More specifically, in the minimal quantity lubrication system, the volume of oil at most 1 ml/minute or less is supplied to a cutting or grinding spot of a workpiece, together with a compressed fluid such as compressed air. Other than compressed air, there may be used a compressed fluid such as nitrogen, argon, helium, carbon dioxide, water and mixed fluids thereof.

A pressure of the compressed fluid of the minimal quantity lubrication system is adjusted so that the scattered oil does not pollute the atmosphere, and a mixed fluid of an oil with a gas or a liquid can sufficiently reach a cutting or grinding spot of a workpiece. The temperature of the compressed fluid is adjusted so as to be in the range from normal room temperature (about 25° C.) or room temperature to −50° C. in view of cooling performance.

The term "oil for sliding surface" used herein denotes the oil used for guiding mechanism of sliding motion of two contacting planes in the machine tool constituent members. For example, in the case of the machine tool which has the mechanism to transfer a table on a bed with a workpiece set thereon toward a cutting or grinding tool, the sliding surface between the table and the bed is lubricated with the oil for sliding surface. And in the case of the machine tool which has the mechanism to transfer a base on a bed with a cutting or grinding tool fixed thereon toward a workpiece, the sliding surface between the base and the bed is lubricated with the oil for sliding surface.

Ester comprised in the oil for cutting and grinding by minimal quantity lubrication system and for sliding surface (hereinafter referred to as "the oil of the present invention") may be a natural ester (generally it is comprised in vegetable oil, or animal fats and oils) or a synthetic one. In the present invention, synthetic esters are preferred because of the stability of the resulting oils and the uniformity of the ester components.

An alcohol comprising an ester may be a monohydric- or a polyhydric-alcohol. An acid comprising the ester may be a monobasic- or a polybasic-acid.

The monohydric alcohol may be one having 1 to 24 carbon atoms, preferably 1 to 12, and more preferably 1 to 8, and may be a straight-chain or a branched one, and may be saturated or unsaturated. Examples of the alcohol having 1 to 24 carbon atoms include methanol, ethanol, straight-chain or branched propanol, straight-chain or branched butanol, straight-chain or branched pentanol, straight-chain or branched hexanol, straight-chain or branched heptanol, straight-chain or branched octanol, straight-chain or branched nonanol, straight-chain or branched decanol, straight-chain or branched undecanol, straight-chain or branched dodecanol, straight-chain or branched tridecanol, straight-chain or branched tetradecanol, straight-chain or branched pentadecanol, straight-chain or branched hexadecanol, straight-chain or branched heptadecanol, straight-chain or branched octadecanol, straight-chain or branched nonadecanol, straight-chain or branched icosanol, straight-chain or branched henicosanol, straight-chain or branched tricosanol, straight-chain or branched tetracosanol and mixtures thereof.

Polyhydric alcohol which may be used in the present invention are those of from dihydric to decahydric, preferably from dihydric to hexahydric. Examples of dihydric to decahydric alcohol include dihydric alcohols such as ethylene glycol, diethylene glycol, polyethylene glycol (trimers to pentadecamers of ethylene glycol), propylene glycol, dipropylene glycol, polypropylene glycol (trimers to pentadecamers of propylene glycol), 1,3-propane diol, 1,2-propane diol, 1,3-butane diol, 1,4-butane diol, 2-methyl-1,2-propane diol, 2-methyl-1,3-propane diol, 1,2-pentane diol, 1,3-pentane diol, 1,4-pentane diol, 1,5-pentane diol, and neopentyl glycol; polyhydric alcohols such as glycerol, polyglycerol (dimers to octamers of glycerol such as diglycerol, triglycerol and tetraglycerol), trimethylolalkane (trimethylolethane, trimethylolpropane, trimethylolbutane, etc.) and dimers to octamers thereof, pentaerythritol and dimers to tetramers thereof, 1,2,4-butanetriol, 1,3,5-pentanetriol, 1,2,6-hexanetriol, 1,2,3,4-butanetetrol, sorbitol, sorbitan, sorbitol glycerol condensation products, adonitol, arabitol, xylytol and mannitol; saccharides such as xylose, arabinose, ribose, rhamnose, glucose, fructose, galactose, mannose, sorbose, cellobiose, maltose, isomaltose, trehalose and sucrose; and mixtures thereof.

Among these polyhydric alcohols, preferred are dihydric- to hexahydric-alcohols such as ethylene glycol, diethylene glycol, polyethylene glycol (trimers to decamers of ethylene glycol), propylene glycol, dipropylene glycol, polypropylene glycol (trimers to decamers of propylene glycol), 1,3-propane diol, 2-methyl-1,2-propane diol, 2-methyl-1,3-propane diol, neopentyl glycol, glycerol, diglycerol, triglycerol, trimethylolalkane (trimethylolethane, trimethylolpropane, trimethylolbutane, etc.) and dimers to tetramers thereof, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol glycerol condensation products, adonitol, arabitol, xylytol, mannitol and mixtures thereof. More preferred are ethylene glycol, propylene glycol, neopentyl glycol, glycerin, trimethylol ethane, trimethylol propane, pentaerythritol, sorbitan and mixtures thereof. Among these, neopentyl glycol, trimethylolethane, trimethylolpropane, pentaerythritol and mixture thereof are preferred due to the higher oxidation stability.

As mentioned above, an alcohol forming the ester may be a monohydric- or polyhydric-alcohol but is preferably a polyhydric alcohol because it can provide excellent lubricity for cutting or grinding operation, and improve the precision of the finished surface and the ability to prevent the tools from wearing, and the resulting oil is low in pour point and improved in handleability during winter season and in cold districts.

The monobasic acid forming the ester to be used in the present invention has 2 to 24 carbon atoms and may be a straight-chain or a branched one, and may be saturated or unsaturated. Examples of the monobasic acid include saturated fatty acids such as acetic acid, propionic acid, straight-chain or branched butanoic acid, straight-chain or branched pentanoic acid, straight-chain or branched hexanoic acid, straight-chain or branched heptanoic acid, straight-chain or branched octanoic acid, straight-chain or branched nonanoic acid, straight-chain or branched decanoic acid, straight-chain or branched undecanoic acid, straight-chain or branched dodecanoic acid, straight-chain or branched tridecanoic acid, straight-chain or branched tetradecanoic acid, straight-chain or branched pentadecanoic acid, straight-chain or branched hexadecanoic acid, straight-chain or branched heptadecanoic acid, straight-chain or branched octadecanoic acid, straight-chain or branched hydroxyoctadecanoic acid, straight-chain or branched nonadecanoic acid, straight-chain or branched icosanoic acid, straight-chain or branched henicosanoic acid, straight-chain or branched docosanoic acid, straight-chain or branched tricosanoic acid and straight-chain or branched tetracosanoic acid; unsaturated fatty acids such as acrylic acid, straight-chain or branched butenoic acid, straight-chain or branched pentenoic acid, straight-chain or branched hexenoic acid, straight-chain or branched heptenoic acid, straight-chain or branched octenoic acid, straight-chain or branched nonenoic acid, straight-chain or branched decenoic acid, straight-chain or branched undecenoic acid, straight-chain or branched dodecenoic acid, straight-chain or branched tridecenoic acid, straight-chain or branched tetradecenoic acid, straight-chain or branched pentadecenoic acid, straight-chain or branched hexadecenoic acid, straight-chain or branched heptadecenoic acid, straight-chain or branched octadecenoic acid, straight-chain or branched hydroxyoctadecenoic acid, straight-chain or branched nonadecenoic acid, straight-chain or branched icosenic acid, straight-chain or branched henicosenic acid, straight-chain or branched docosenoic acid, straight-chain or branched tricosenic acid and straight-chain or branched tetracosenoic acid; and mixtures thereof. Among these, preferred are saturated fatty acids having 3 to 20 carbon atoms, unsaturated fatty acids having 3 to 22 carbon atoms and mixtures thereof because they can provide excellent lubricity, and increase the precision of the finished surface and the effect to prevent tools from wearing. More preferred are saturated fatty acids having 4 to 18 carbon atoms, unsaturated fatty acids having 4 to 18 carbon atoms and mixtures thereof due to the resistance to stickiness.

Examples of the polybasic acid which may be used in the present invention are dibasic acids having 2 to 16 carbon atoms and trimellitic acid. The dibasic acids having 2 to 16 carbon atoms may be a straight-chain or a branched one, and may be saturated and unsaturated. Specific examples of the dibasic acids are ethanoic dibasic acid, propanoic dibasic acid, straight-chain or branched butanoic dibasic acid, straight-chain or branched pentanoic dibasic acid, straight-chain or branched hexanoic dibasic acid, straight-chain or branched heptanoic dibasic acid, straight-chain or branched octanoic dibasic acid, straight-chain or branched nonanoic dibasic acid, straight-chain or branched decanoic dibasic acid, straight-chain or branched undecanoic dibasic acid, straight-chain or branched dodecanoic dibasic acid, straight-chain or branched tridecanoic dibasic acid, straight-chain or branched tetradecanoic dibasic acid, straight-chain or branched heptadecanoic dibasic acid, straight-chain or branched hexadecanoic dibasic acid, straight-chain or branched hexenoic dibasic acid, straight-chain or branched heptenoic dibasic acid, straight-chain or branched otcenoic dibasic acid, straight-chain or branched nonenoic dibasic acid, straight-chain or branched decenoic dibasic acid, straight-chain or branched undecenoic dibasic acid, straight-chain or branched dodecenoic dibasic acid, straight-chain or branched tridecenoic dibasic acid, straight-chain or branched tetradecenoic dibasic acid, straight-chain or branched heptadecenoic dibasic acid and straight-chain or branched hexadecenoic dibasic acid; and mixtures thereof.

As described above, an acid forming the ester of the present invention may be a monobasic acid or a polybasic acid. However, preferred are monobasic acids because the resulting oil is increased in viscosity index and can be easily formed into mist and exhibit the improved resistance to stickiness.

No particular limitation is imposed on the combination of an alcohol and an acid forming an ester used as a base oil of the oil of the present invention.

Examples of the combination are as follows:
(1) an ester of a monohydric alcohol and a monobasic acid;
(2) an ester of a polyhydric alcohol and a monobasic acid;
(3) an ester of a monohydric alcohol and a polybasic acid;
(4) an ester of a polyhydric alcohol and a polybasic acid;
(5) a mixed ester of a mixture of a monohydric alcohol and a polyhydric alcohol and a polybasic acid;
(6) a mixed ester of a polyhydric alcohol, and a mixture of a monobasic acid, and a polybasic acid;
(7) a mixed ester of a mixture of a monohydric alcohol and a polyhydric alcohol, and a monobasic acid and a polybasic acid.

Among these combinations, preferred one is (2) an ester of a polyhydric alcohol and a monobasic acid. The use of this ester group gives advantages such as the higher precision of the finished surface of workpieces, the higher anti-wear of cutting tool tips due to the higher lubricity for cutting or grinding, the better availability of the lower pour point ones, the easier handling ability during winter season and in cold districts, the better availability of the higher viscosity index and the higher mist forming ability.

Natural fats and oils which may be used in the present invention are vegetable oils such as palm oil, palm kernel oil, rapeseed oil, soybean oil, sunflower oil, and high-oleic rapeseed oil and high-oleic sunflower oil comprising the higher content of oleic acid in the fatty acid which forms glycerides due to the selective breeding or the genetic modification, and animal oils such as lard.

According to the present invention, in the case of using a polyhydric alcohol, the resulting ester may be a full ester in which all of the hydroxyl groups are esterified, or a partial ester in which some of hydroxyl groups remain unesterified. In the case of using a polybasic acid, the resulting organic ester may be a full ester in which all of the carboxyl groups are esterified, or a partial ester in which some of carboxyl groups remain unesterified.

An iodine value of the ester used in the present invention preferably ranges from 0 to 80, more preferably from 0 to 60, furthermore preferably from 0 to 40, even furthermore preferably from 0 to 20 and most preferably from 0 to 10. A bromine number of the ester used in the present invention preferably ranges from 0 to 50 $gBr_2/100$ g, more preferably from 0 to 30 $gBr_2/100$ g, furthermore preferably from 0 to 20 $gBr_2/100$ g and most preferably from 0 to 10 $gBr_2/100$ g. Those iodine values and bromine numbers having the aforementioned ranges give the improved resistance to stickiness of the oil.

The term "iodine value" used herein denotes a value measured by the indicator titration method defined by JIS K 0070 "Test methods for acid value, saponification value, ester value, iodine value, hydroxyl value and unsaponifiable matter of chemical products". The term "bromine number" used herein denotes a value measured by JIS K 2605 "Chemical products—Determination of bromine number—Electrometric method".

Additionally, in order to give the better lubricating performance to the oil of the present invention, it is preferred to use an ester having a hydroxyl value of 0.01 to 300 mgKOH/g and a saponification value of 100 to 500 mgKOH/g. In order to obtain an oil with further enhanced lubricity in the present invention, the upper limit hydroxyl value is preferably 200 mgKOH/g and most preferably 150 mgKOH/g, while the lower limit is 0.1 mgKOH/g, preferably 0.5 mgKOH/g, more preferably 1 mgKOH/g, further more preferably 3 mgKOH/g and most preferably 5 mgKOH/g. Besides, the upper limit of ester value is more preferably 400 mg/KOH/g, while the lower limit is more preferably 200 mgKOH/g.

The term "hydroxyl value" used herein denotes a value measured by the indicator titration method defined by JIS K 0070 "Test methods for acid value, saponification value, ester value, iodine value, hydroxyl value and unsaponifiable matter of chemical products". The term "saponification value" used herein denotes a value measured by the indicator titration method defined by JIS K 2503 "Testing method of lubricating oil for aircraft".

In the present invention, there is no limitation of kinematic viscosity of the ester. However, the upper limit of the kinematic viscosity at 40° C. is preferably 200 $mm^2/s$, more preferably 100 $mm^2/s$, furthermore preferably 75 $mm^2/s$ and most preferably 50 $mm^2/s$, while the lower limit of the kinematic viscosity is preferably 1 $mm^2/s$, more preferably 3 $mm^2/s$ and most preferably 5 $mm^2/s$.

In the present invention, there is no limitation of pour point and viscosity index of the ester. However, pour point is preferably not more than −10° C. and more preferably not more than −20° C. Viscosity index is preferably not less than 100 and not more than 200.

The oil of the present invention may be composed of said ester alone (the content of the ester in the oil is 100% by mass), and other base oil or adjuvant may be added to the oil of the present invention. However, the ester content is 10% by mass or more, preferably 20% by mass or more, more preferably 30% by mass or more and most preferably 50% by mass or more based on the total weight of the oil considering the biodegradability that the oil component is easily decomposed by microorganism such as bacteria and the peripheral environment is preserved.

Though the oil of the present invention comprises the aforementioned ester, other conventionally known base oils may be used as the base oil for lubricating oil unless the significant deterioration of the performance may occur.

Such base oil other than the esters comprised in the oil of the present invention may be a mineral oil and a synthetic oil. The mineral oil may be paraffinic- or naphthenic-oils which are produced by lubricant fractions derived from the atmospheric- or vacuum-distillation of crude oil applying the combination of refining processes such as solvent deasphalting, solvent extraction, hydro-cracking, solvent dewaxing, catalytic dewaxing, hydrorefining, sulfuric acid washing and clay treatment. Eligible synthetic oils are poly-α-olefins (such as polybutene, 1-octene oligomer and 1-decene oligomer), alkylbenzene, alkylnaphthalene, polyoxyalkylene glycol and polyphenyl ether. No particular limitation is imposed on the content of such base oils. However, the content of the base oils is preferably 90% by mass or less, more preferably 70% by mass or less and most preferably 50% by mass or less based on the total amount of composition. In the viewpoint of biodegradability, it is preferred that the oil of the present invention comprises a base oil made of the ester alone (100% by mass).

Furthermore, the oil of the present invention preferably comprises phosphorus compounds and/or sulfur compounds to improve the machining property and frictional property. It is more preferably to use both compounds together.

Traditional beliefs indicate that the no effect through addition was expected for the ester based lubricant if the contents of the phosphorous and/or sulfur compounds are less than a specific amount. In addition, it has been also believed that the large amount of phosphorus compounds and/or sulfur compounds in the cutting or grinding oil significantly reduce the tool life. According to these reasons, the addition of the phosphorus and/or sulfur compounds to the ester based cutting or grinding oil has been assumed to be impractical.

Contrary to the conventional beliefs, coexistence of ester and phosphorus and/or sulfur compounds in the oil of the present invention results in the small reduction of the tool life and the large improvement of machining property and frictional property.

Examples of phosphorus compound according to the present invention include phosphate ester, acid phosphate ester, acid phosphate ester amine salt, chlorinated phosphate ester, phosphite ester and phosphorothionate. These phosphorus compounds include esters of phosphoric acid, phosphorous acid or thiophosphoric acid and alkanol or polyether type alcohol, and the derivatives thereof. More specifically, examples of phosphate ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate and xylenyldiphenyl phosphate.

Examples of acid phosphate ester include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl, acid phosphate, ditetradecyl acid phosphate, dipentadecyl acid phosphate, dihexadecyl acid phosphate, diheptadecyl acid phosphate, dioctadecyl acid phosphate and dioleyl acid phosphate.

Examples of acid phosphate ester amine salt include amine salts of the aforementioned acid phosphate ester such as methylamine, propylamine, butylamine, pentylamine, hexylamine, heptylamine, octylamine, dimethylamine, dipropylamine, dibutylamine, dipentylamine, dihexylamine, diheptylamine, dioctylamine, trimethylamine, tripropylamine, tributylamine, tripentylamine, trihexylamine, triheptylamine and trioctylamine.

Examples of chlorinated phosphate ester include tris-dichloroprorylphosphate, trischloroethylphosphate, trischlorophenylphosphate and polyoxyalkylenebis[di(chloroalkyl)] phosphate.

Examples of phosphite esters include dibutylphosphite, dipentylphosphite, dihexylphosphite, diheptylphosphite, dioctylphosphite, dinonylphosphite, didecylphosphite, diundecylphosphite, didodecylphosphite, dioleylphosphite, diphenylphosphite, dicresylphosphite, tributylphosphite, tripentylphosphite, trihexylphosphite, triheptylphosphite, trioctylphosphite, trinonylphosphite, tridecylphosphite, triundecylphosphite, tridodecylphosphite, trioleylphosphite, triphenylphosphite and tricresylphosphite.

Examples of phosphorothionate include tributylphosphorothionate, tripentylphosphorothionate, trihexylphosphorothionate, triheptylphosphorothionate, trioctylphosphorothionate, trinonylphosphorothionate, tridecylphosphorothionate, triundecylphosphorothionate, tridodecylphosphorothionate, tritridecylphosphorothionate, tritetradecylphosphorothionate, tripentadecylphosphorothionate, trihexadecylphosphorothionate, triheptadecylphosphorothionate, trioctadecylphosphorothionate, trioleylphosphorothionate, triphenylphosphorothionate, tricresylphosphorothionate, trixylenylphosphorothionate, cresyldiphenylphosphorothionate, xylenyldiphenylphosphorothionate, tris(n-propylphenyl)phosphorothionate, tris(isopropylphenyl)phosphorothionate, tris(n-butylphenyl)phosphorothionate, tris(isobutylphenyl)phosphorothionate, tris(s-butylphenyl)phosphorothionate, tris(t-butylphenyl) phosphorothionate. Mixtures of not less than 2 compounds shown above are also usable.

In the present invention, preferably used are phosphate ester, acid phosphate ester and phosphite ester due to the higher machining property and friction property. More preferably used are triarylphosphate, dialkylacidphosphate and dialkylphosphite.

No particular limitation is imposed on the content of phosphorus compounds comprised as an additive of the oil of the present invention. However, from the viewpoint of the improvement of machining property and frictional property, the content is 0.001% by mass or more (based on the total amount of the composition of base oil and additives), preferably 0.005% by mass or more and more preferably 0.01% by mass or more. With the objective of tool life, the content is preferably 5% by mass or less and more preferably 3% by mass or less.

Examples of sulfur compounds of the present invention include dihydrocarbylpolysulfide, sulfide ester, sulfide mineral oil, zinc dithiophosphoric acid compounds, zinc dithiocarbamic acid compounds, molybdenum dithiophosphoric acid and molybdenum dithiocarbamic acid compounds.

Dihydrocarbylpolysulfides are generally called as sulfur compounds such as polysulfide or olefin sulfide. They are represented by the following general formula (1):

$$R^{10}-S_x-R^{11} \qquad (1)$$

[In the formula (1), $R^{10}$ and $R^{11}$ are identical to or different from each other, and individually mean a straight-chain or branched alkyl group having carbon atoms from 3 to 20, an aryl group having carbon atoms from 6 to 20, an alkylaryl group having carbon atoms from 6 to 20 or an arylalkyl group having carbon atoms from 6 to 20, x is an integer from 2 to 6, preferably from 2 to 5.]

Examples of $R^{10}$ and $R^{11}$ represented in the general formula (1) include a straight-chain or branched alkyl group such as n-propyl group, isopropyl group, n-butyl group, sec-butyl group, tert-butyl group, straight-chain or branched pentyl group, straight-chain or branched hexyl group, straight-chain or branched heptyl group, straight-chain or branched octyl group, straight-chain or branched nonyl group, straight-chain or branched decyl group, straight-chain or branched undecyl group, straight-chain or branched dodecyl group, straight-chain or branched tridecyl group, straight-chain or branched tetradecyl group, straight-chain or branched pentadecyl group, straight-chain or branched hexadecyl group, straight-chain or branched heptadecyl group, straight-chain or branched octadecyl group, straight-chain or branched nonadecyl group and straight-chain or branched icosyl group; aryl group such as phenyl group and naphthyl group; alkylaryl group such as tolyl group (include all structural isomers), ethylphenyl group (include all structural isomers), straight-chain or branched propylphenyl group (include all structural isomers), straight-chain or branched butylphenyl group (include all structural isomers), straight-chain or branched pentylphenyl group (include all structural isomers), straight-chain or branched hexylphenyl group (include all structural isomers), straight-chain or branched heptylphenyl group (include all structural isomers), straight-chain or branched octylphenyl group (include all structural isomers), straight-chain or branched nonylphenyl group (include all structural isomers), straight-chain or branched decylphenyl group (include all structural isomers), straight-chain or branched undecylphenyl group (include all structural isomers), straight-chain or branched dodecylphenyl group (include all structural isomers), xylyl group (include all structural isomers), ethylmethylphenyl group (include all structural isomers), diethylphenyl group (include all structural isomers), di(straight-chain or branched) propylphenyl group (include all structural isomers), di(straight-chain or branched) butylphenyl group (include all structural isomers), naphthylphenyl group (include all structural isomers), ethylphenyl group (include all structural isomers), di(straight-chain or branched) propylphenyl group (include all structural isomers), straight-chain or branched propylphenyl group (include all structural isomers), straight-chain or branched butylnaphthyl group (include all structural isomers), straight-chain or branched dimethylnaphthyl group (include all structural isomers), straight-chain or branched ethylmethylnaphthyl group (include all structural isomers), straight-chain or branched diethylnaphthyl group (include all structural isomers), di(straight-chain or branched) propylnaphthyl group (include all structural isomers) and di(straight-chain or branched) butylnaphthyl group (include all structural isomers); and arylalkyl group such as benzyl group, phenylethyl group (include all structural isomers) and phenylpropyl group (include all structural isomers). Among these groups, $R^9$ and $R^{10}$ of the general formula (6) are preferably alkyl group derived from propylene, 1-butene or isobutylene having carbon atoms from 3 to 18, aryl group having carbon atoms from 6 to 8, alkylaryl group or arylalkyl group. Examples of groups include alkyl group such as isopropyl group, branched hexyl group derived from propylene dimers (include all branched isomers), branched nonyl group derived from propylene trimers (include all branched isomers), branched dodecyl group derived from propylene tetramers (include all branched isomers), branched pentadecyl group derived from propylene pentamers (include all branched isomers), branched octadecyl group derived from propylene hexamers (include all branched isomers), sec-butyl group, tert-butyl group, branched octyl group derived from 1-butene dimers (include all branched isomers), branched octyl group derived from isobutylene dimers (include all branched isomers), branched dodecyl group derived from 1-butene trimers (include all branched isomers), branched dodecyl group derived from isobutylene trimers (include all branched isomers) and branched hexadecyl group derived from 1-butene tetramers (include all branched isomers); alkylaryl group such as phenyl group, tolyl group (include all structural isomers), ethylphenyl group (include all structural isomers) and xylyl group (include all structural isomers); and arylalkyl group such as benzyl group and phenylethyl group (include all structural isomers).

Furthermore, in the viewpoint of machining property, preferable $R^{10}$ and $R^{11}$ of the general formula (1) are individually a branched alkyl group having carbon atoms from 3 to 18 derived from ethylene or propylene. More preferable one is a branched alkyl group having carbon atoms from 6 to 15 derived from ethylene or propylene.

Examples of sulfide ester include sulfurized products of animal and vegetable oils such as beef tallow, lard, fish oil, rapeseed oil and soybeen oil; unsaturated fatty acid ester obtained from the reaction of unsaturated fatty acids (including oleic acid, linolic acid or fatty acids extracted the aforementioned animal and vegetable oils) and various kinds of alcohols; and the mixture thereof using an arbitrary method of sulfurization.

Sulfurized mineral oil means the mineral oil into which elemental sulfur is dissolved. There is no particular limitation with respect to the mineral oil of the present invention. Examples of mineral oils are paraffinic- or naphthenic-oils which are produced by lubricant fractions derived from the atmospheric- or vacuum-distillation of crude oil applying the combination of refining processes such as solvent deasphalting, solvent extraction, hydro-cracking, solvent dewaxing, catalytic dewaxing, hydrorefining, sulfuric acid washing and clay treatment. Examples of morphology of elemental sulfur include lump, powder and melt. Preferably used are powder and melt because they are dissolved in base oil effectively. Although the use of melt has an advantage that dissolution is carried out within a extremely short period due to liquid mixing, the handling technique is not easy because of the reasons such as handling of sulfur melt over melting point, requirement of extra heating apparatus and safety operation under high temperature environment. On the other hand, powdered sulfur is preferably used due to the reasonable price and easy handling, moreover, dissolving time is short enough for practical use. There is no particular limitation of sulfur contents of the sulfurized mineral oil of the present invention. Generally used are 0.05 to 1.0% by mass based on the total amount of sulfurized mineral oil. Preferably used are 0.1 to 0.5% by mass.

Zinc dithiophosphate compound, zinc dithiocarbamate compound, molybdenum dithiophosphate compound and molybdenum dithiocarbamate compound means compounds represented by the following formulae from (2) to (5).

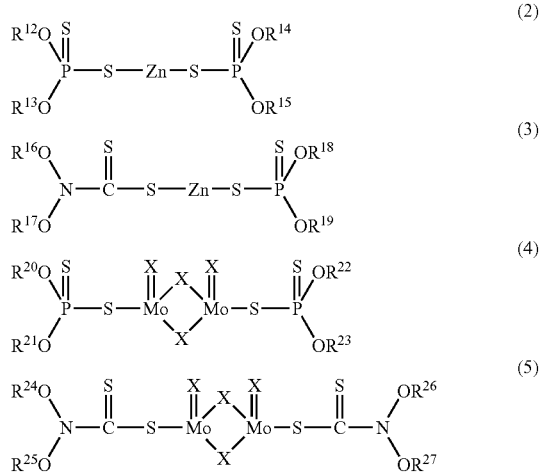

[Wherein, in the general formulae from (2) to (5), $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$ and $R^{27}$ are identical to or different from each other, and represent individually a hydrocarbon group having carbon atoms of at least one, and X is an oxygen atom or a sulfur atom.]

Examples of hydrocarbon groups represented by $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$ and $R^{27}$ include an alkyl group such as methyl group (including all the branched isomers), propyl group (including all the branched isomers), butyl group (including all the branched isomers), pentyl group (including all the branched isomers), hexyl group (including all the branched isomers), heptyl group (including all the branched isomers), octyl group (including all the branched isomers), nonyl group (including all the branched isomers), decyl group (including all the branched isomers), undecyl group (including all the branched isomers), dodecyl group (including all the branched isomers), tridecyl group (including all the branched isomers), tetradecyl group (including all the branched isomers), pentadecyl group (including all the branched isomers) , hexadecyl group (including all the branched isomers), heptadecyl group (including all the branched isomers), octadecyl group (including all the branched isomers), nonadecyl group (including all the branched isomers), icosyl group (including all the branched isomers), henicosyl group (including all the branched isomers), docosyl group (including all the branched isomers), tricosyl group (including all the branched isomers) and tetracosyl group (including all the branched isomers); a cycloalkyl group such as cyclopentyl group, cyclohexyl group, cycloheptyl group; an alkylcycloalkyl group such as methylcyclopentyl group (including all the substituted isomers), ethylcyclopentyl group (including all the substituted isomers), dimethylcyclopentyl group (including all the substituted isomers), propylcyclopentyl group (including all the branched and substituted isomers), methylethylcyclopentyl group (including all the substituted isomers), trimethylcyclopentyl group (including all the substituted isomers), butylcyclopentyl group (including all the branched and substituted isomers), methylpropylcyclopentyl group (including all the branched and substituted isomers), diethylcyclopentyl group (including all the substituted isomers), dimethylethylcyclopentyl group (including all the substituted isomers), methyl-cyclohexyl group (including all the substituted isomers), ethylcyclohexyl group (including all the substituted isomers), dimethylcyclohexyl group (including all the substituted isomers), propylcyclohexyl group (including all the branched and substituted isomers), methylethylcyclohexyl group (including all the substituted isomers), trimethylcyclohexyl group (including all the substituted isomers), butylcyclohexyl group (including all the branched and substituted isomers), methylpropylcyclohexyl group (including all the branched and substituted isomers), diethylcyclohexyl group (including all the substituted isomers) and dimethylethylcyclohexyl group (including all the substituted isomers); an aryl group such as phenyl group and naphthyl group; an alkylaryl group such as tolyl group (include all the substituted isomers), xylyl group (include all the substituted isomers), ethylphenyl group (include all the substituted isomers), propylphenyl (include all the branched and substituted isomers), methylethylphenyl (include all the substituted isomers), trimethylphenyl group (include all the substituted isomers), butylphenyl group (include all the branched and substituted isomers), methylpropylphenyl group (include all the branched and substituted isomers), diethylphenyl group (include all the substituted isomers), dimethylethylphenyl group (include all the substituted isomers), pentylphenyl (include all the branched and substituted isomers), hexylphenyl (include all the branched and substituted isomers), heptylphenyl (include all the branched and substituted isomers), octylphenyl (include all the branched and substituted isomers), nonylphenyl (include all the branched and substituted isomers), decylphenyl (include all the branched and substituted isomers), undecylphenyl (include all the branched and substituted isomers), dodecylphenyl (include all the branched and substituted isomers), tridecylphenyl (include all the branched and substituted isomers), tetradecylphenyl (include all the branched and substituted isomers), pentadecylphenyl (include all the branched and substituted isomers), hexadecylphenyl (include all the branched and substituted isomers), heptadecylphenyl (include all the branched and substituted isomers) and octadecylphenyl (include all the branched and substituted isomers); and an arylalkyl group such as benzyl group, phenetyl group, phenylpropyl group (include all the branched isomers) and phenylbutyl group (include all the branched isomers).

Among those sulfur compounds in the present invention, preferably used are at least one compound selecting from the group consisting of dihydrocarbilpolysulfide and sulfide ester. The use of these compounds results in the higher machining property and frictional property.

No particular limitation is imposed on the content of sulfur compounds comprised as an additive of the oil of the present invention. However, the sulfur compound content is preferably 0.01% by mass or more, and more preferably 0.05% by mass or more based on the total weight of the oil (based on the total weight of base oil and all the additives) with the objective of the improvement of machining property and frictional property. From the viewpoint of tool life, the content is preferably 10% by mass or less and more preferably 5% by mass or less.

Preferably, the oil of the present invention comprises antioxidants. The addition of antioxidants can suppress the stickiness caused by the deterioration of the oil. Eligible antioxidants are those which have been used for a lubricant or as a food additive such as 2,6-di-tert-butyl-p-cresol (DBPC), 4,4'-methylenebis(2,6-di-tert-butylphenol), 4,4'-bis(2,6-di-tert-butylphenol), 4,4'-thiobis(6-tert-butyl-o-cresol), ascorbic acid (vitamin C), fatty acid ester of ascorbic acid, tocopherol (vitamin E), 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediole (TBHQ) and 2,4,5-trihydroxybutyrophenone (THBP).

Among these, preferred are ascoribic acid (vitamin C), fatty acid ester of ascoribic acid, tocopherol (vitamin E), 2,6-di-tert-butyl-p-cresol (DBPC), 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediole (TBHQ) and 2,4,5-trihydroxybutyrophenone (THBP). More preferred are ascoribic acid (vitamin C), fatty acid ester of ascoribic acid, tocopherol (vitamin E), 2,6-di-tert-butyl-p-cresol (DBPC) and 3,5-di-tert-butyl-4-hydroxyanisole.

No particular limitation is imposed on the content of the antioxidants. However, in order to maintain an excellent stability against the oxidation, the content of the antioxidant is preferably 0.01% by mass or more, more preferably 0.05% by mass or more, and most preferably 0.1% by mass or more based on the total weight of the composition. Since no further effect cannot be expected in spite of more addition, the content is preferably 10% by mass or less, more preferably 5% by mass or less, and most preferably 3% by mass or less based on the total weight of the composition.

The oil according to the present invention preferably comprises oiliness improvers. The addition of oiliness improvers can enhance the lubricity of the oil such as machining property. Examples of the oiliness improvers are (A) alcohols, (B) carboxylic acids, (C) sulfides of unsaturated carboxylic acids, (D) compounds represented by the following general formula (6):

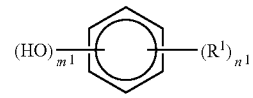

(6)

(In the general formula (6), $R^1$ represents a hydrocarbon group having carbon atoms from 1 to 30, $m^1$ is an integer from 1 to 6 and $n^1$ is an integer from 0 to 5.), (E) compounds represented by the following general formula (7):

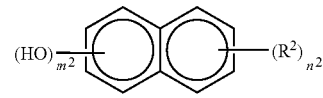

(7)

(In the general formula (7), $R^2$ represents a hydrocarbon group having carbon atoms from 1 to 30, $m^2$ is an integer from 1 to 6 and $n^2$ is an integer from 0 to 5.), (F) polyoxyalkylene compounds, and (G) esters. The oiliness improvers will be each described hereinafter, respectively.

Alcohols (A) may be monohydric- or polyhydric-alcohols. Preferred are monohydric alcohols having 1 to 40 carbon atoms, preferably 1 to 25 carbon atoms, and most preferably 8 to 18 carbon atoms because the resulting oil gives enhanced lubricity and excellent machinability. Specific examples of such monohydric alcohols are those already exemplified with respect to alcohols forming the ester used as a base oil. These alcohols may be straight-chain or branched ones, and may be saturated or unsaturated. However, saturated alcohols are preferred with the objective of less stickiness.

Carboxylic acids (B) may be monobasic- or polybasic-acids. Preferred are monocarboxylic acids having 1 to 40 carbon atoms, more preferred are those having 5 to 25 carbon atoms, and the most preferred are those having 5 to 20 carbon atoms because the resulting oil gives enhanced lubricity and excellent machinability. Specific examples of carboxylic acids that form the ester used as base oil can be shown. These carboxylic acids may be straight-chain or branched ones, and may be saturated or unsaturated. However, saturated alcohols are preferred in the viewpoint of stickiness.

Sulfides of unsaturated carboxylic acids (C) are sulfides of unsaturated one selected from carboxylic acids described at (B). Specific examples are sulfides of oleic acid.

Compounds (D) is represented by the general formula (6). Examples of the hydrocarbon group represented by $R^1$ having 1 to 30 carbon atoms are straight-chain or branched alkyl groups having 1 to 30 carbon atoms, cycloalkyl groups having 5 to 7 carbon atoms, alkylcycloalkyl groups having 6 to 30 carbon atoms, straight-chain or branched alkenyl groups having 2 to 30 carbon atoms, aryl groups having 6 to 10 carbon atoms, alkylaryl groups having 7 to 30 carbon atoms, and arylalkyl groups having 7 to 30 carbon atoms. Among these groups, $R^1$ is preferably a straight-chain or branched alkyl group having 1 to 30 carbon atoms, more preferably a straight-chain or branched alkyl group having 1 to 20 carbon atoms, further more preferably a straight-chain or branched alkyl group having 1 to 10 carbon atoms, and most preferably a straight-chain or branched alkyl group having 1 to 4 carbon atoms. Specific examples of the straight-chain or branched alkyl group having 1 to 4 carbon atoms are methyl, ethyl, straight-chain or branched propyl, and straight-chain or branched butyl group.

No particular limitation is imposed on the position of the hydroxyl group. However, in the case of the compound which has two or more hydroxyl groups, the hydroxyl groups are preferably substituted at carbon atoms located adjacently each other. The symbol $m^1$ is an integer preferably from of 1 to 3, and more preferably 2. The symbol $n^1$ is an integer preferably from 0 to 3, and more preferably 1 or 2. Example of the compound of formula (6) is p-tert-butylcatechol.

In the compounds (E) represented by the forgoing general formula (7), examples of the hydrocarbon group denoted by $R^2$ having 1 to 30 carbon atoms may be the same group those already shown as $R^1$ in the formula (6). Therefore, preferred examples are the same as those for $R^1$. No particular limitation is imposed on the position of the hydroxyl group. However, in the case of the compound that has two or more hydroxyl groups, the hydroxyl groups are preferably substituted at carbon atoms located adjacently each other. The symbol $m^2$ is an integer preferably from 1 to 3, and more preferably 2. The symbol $n^2$ is an integer preferably from 0 to 3, and more preferably 1 or 2. Examples of the compound represented by general formula (7) are 2,2-dihydroxynaphthalene, 2,3-dihydroxynaphthalene, and the like.

Polyoxyalkylene compounds (F) are represented by the following general formulae (8) or (9).

$$R^3O—(R^4O)_{m3}—R^5 \quad (8)$$

(In the general formula (8), $R^3$ and $R^5$ independently represent a hydrogen or a hydrocarbon group having 1 to 30 carbon atoms, $R^4$ is an alkylene group having 2 to 4 carbon atoms, and $m^3$ is an integer selected so as to provide the number-average molecular weight of from 100 to 3,500.)

$$A-[(R^6O)_{n4}—R^7]_{m4} \quad (9)$$

(In the general formula (9), A is a residue resulting from the removal of all or some of the hydrogen atoms of the hydroxyl groups of a polyhydric alcohol having 3 to 10 hydroxyl groups, $R^6$ is an alkylene group having 2 to 4 carbon atoms, $R^7$ is a hydrogen atom or a hydrocarbon group having 1 to 30 carbon atoms, $n^4$ is an integer selected so as to provide the number-average molecular weight of from 100 to 3,500, and $m^4$ indicates the same number as that of the removed hydrogen atoms from the hydroxyl groups of A.)

In the forgoing general formula (8), at least one of $R^3$ and $R^5$ is preferably a hydrogen atom. Examples of hydrocarbon groups having 1 to 30 carbon atoms for $R^3$ and $R^5$ may be the same hydrocarbon groups as those already shown by $R^1$ and $R^3$ in the general formula (6). Thus, preferred examples are the same. Specific examples of the alkylene group having 2 to 4 carbon atoms for $R^4$ are ethylene group, propylene group (methylethylene), and butylene group (ethylethylene). The symbol $m^3$ is an integer selected so as to provide the number-average molecular weight of from 300 to 2,000, preferably 500 to 1,500.

In the general formula (9), specific examples of the polyhydric alcohol having 3 to 10 hydroxyl groups forming the residue A are polyhydric alcohols such as glycerol, polyglycerol (dimers to tetramers of glycerol, such as diglycerol, triglycerol and tetraglycerol), trimethylolalkane (trimethylolethane, trimethylolpropane, trimethylolbutane) and dimers to tetramers thereof, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol glycerin condensation products, adonitol, arabitol, xylitol, mannitol, iditol, talitol, dulcitol and allitol; and saccharides such as xylose, arabinose, ribose, rhamnose, glucose, fructose, galactose, mannose, sorbose, cellobiose, maltose, isomaltose, trehalose and sucrose. Among these compounds, preferred are glycerin, polyglycerin, trimethylolalkanes and dimers to tetramers thereof, pentaerythritol, dipentaerythritol, sorbitol and sorbitan.

Examples of the alkylene group having 2 to 4 carbon atoms for $R^6$ are the same ones as those already exemplified with respect to $R^4$ of the general formula (8). Examples of the hydrocarbon group having 1 to 30 carbon atoms for $R^7$ are the same ones as those already exemplified with respect to $R^1$ of the general formula (6) and thus preferred examples are the same as those for $R^1$. In addition, at least one of the $R^7$ groups the number of which is expressed by $m^4$ is preferably a hydrogen atom, and more preferably, all of the $R^7$ groups are hydrogen atoms. The symbol $n^4$ is an integer selected so as to provide the number-average molecular weight of from 300 to 2,000, and more preferably from 500 to 1,500.

Esters (G) is composed of an alcohol which may be either a monohydric- or polyhydric-alcohol, and a carboxylic acid which may be either a monobasic or polybasic acid.

Examples of the monohydric and polyhydric alcohols are those already exemplified with respect to the ester used as a base oil. Therefore, preferred examples are also the same as those exemplified with respect to the ester used as a base oil. Examples of the monobasic- and polybasic-acids are those as described with respect to the ester used as a base oil. Preferred examples are also the same as those exemplified with respect to the ester used as a base oil.

No particular limitation is imposed on the combination of alcohols and carboxylic acids, so any arbitrary combination is acceptable. For instance, the combination may be as follows:

(1) an ester of a monohydric alcohol and a monobasic acid;
(2) an ester of a polyhydric alcohol and a monobasic acid;
(3) an ester of a monohydric alcohol and a polybasic acid;
(4) an ester of a polyhydric alcohol and a polybasic acid;

(5) a mixed ester of a mixture of a monohydric alcohol and a polyhydric alcohol, and a polybasic acid;

(6) a mixed ester of a polyhydric alcohol, and a mixture of a monobasic acid and a polybasic acid; and (7) a mixed ester of a mixture of a monohydric alcohol and a polyhydric alcohol, and a mixture of a monobasic acid and a polybasic acid.

In the case of polyhydric alcohol, the resulting ester may be a full ester in which all the hydroxyl groups of polyhydric alcohol are esterified, or a partial ester in which some of hydroxyl groups remain unesterified. In the case of polybasic acid, the resulting ester may be a full ester in which all the carboxyl groups of polybasic acid are esterified, or a partial ester in which some of carboxyl groups remain unesterified.

No particular limitation is imposed on the total carbon number of esters comprised as oiliness improvers. However, in order to obtain enhanced lubricity and machinability, the ester has preferably 7 or more, more preferably 9 or more, and most preferably 11 or more total carbon atoms. Further, in order to suppress the occurrence of stain or corrosion, the total number of carbon atoms comprised in ester is preferably 60 or less, more preferably 45 or less, even more preferably 26 or less, even further more preferably 24 or less, and most preferably 22 or less.

One of the above-described oiliness improvers may be used alone, and a mixture of two or more of those improvers also may be used. Among these improvers, preferably used is one or not less than two mixtures selected from the groups consisting of alcohol (A) and carboxylic acid (B).

No particular limitation is imposed on the content of the oiliness improvers in the oil. However, in order to obtain enhanced lubricity such as machinability, the preferable total content of oiliness improvers is 0.1% by mass or more, more preferably 0.2% by mass or more, and most preferably 0.5% by mass or more, based on the total weight of the oil. In order to suppress the occurrence of stain or corrosion, the preferable upper limit content of the oiliness improvers is 30% by mass or less, more preferably 20% by mass or less, and even more preferably 10% by mass or less.

Furthermore, the oil of the present invention may include conventional additives other than those described above. Examples of such additives are extreme pressure additives (including chlorinated compounds) except the aforementioned phosphorus compounds and sulfur compounds; wetting agents such as diethylene glycol monoalkylether; film forming agents such as acrylic polymer, paraffin wax, microwax, slack wax and polyolefin wax; water substituting agents such as fatty acid amine salts; solid lubricants such as graphite, graphite fluoride, molybdenum disulfide, boron nitride and polyethylene powder; corrosion inhibitors such as amines, alkanolamines, amides, carboxylic acids, carboxylates, sulfonates, phosphoric acid, phosphates and partial esters of polyhydric alcohols; metal passivators such as benzotriazole and thiadiazole; antifoaming agents such as methylsilicone, fluorosilicone and polyacrylate; and ashless dispersants such as alkenylsuccinimide, benzylamine, and polyalkenylamineaminoamide. No particular limitation is imposed on the content of these known additives. However, the additives are generally added so that the total amount thereof is within the range of 0.1 to 10% by mass, based on the total weight of the oil.

No particular limitation is imposed on the kinematic viscosity of the oil of the present invention. However, considering the easiness of supplying the oil to the working portion, the upper limit of kinematic viscosity at 40° C. is preferably 200 mm$^2$/s, more preferably 100 mm$^2$/s, even more preferably 75 mm$^2$/s, and most preferably 50 mm$^2$/s, while the lower limit is preferably 1 mm$^2$/s, more preferably 3 mm$^2$/s, and most preferably 5 mm$^2$/s.

The oil of the present invention having aforementioned composition can be used as oil for cutting and grinding by minimal quantity lubrication system and also as oil for sliding surfaces. Thus, using the same oil for both purposes can contribute to the space saving and energy saving of machine tools.

Furthermore, the oil of the present invention may be used as a lubricating oil for bearings, hydraulic units and gear portions. Therefore, the oil of the present invention can be used to lubricate these portions of a machine as a multipurpose oil.

As for the bearing lubrication, there are oil lubrication system and mist lubrication system and the like. The oil of the present invention can be used for both of these systems.

The oil lubrication system for bearing means the way of lubrication wherein oil is supplied in the liquid state to the bearing to obtain a smooth sliding. This system also expects a cooling effect on the bearing by oil itself. Lubricating oil for this system is required higher lubricity (for example, anti-wear and anti-seizure properties) in the portion of bearing sliding. Additionally, since this system is often used at high temperature, the oil is required high heat resistance property to prevent a thermal degradation. The oil of the present invention can be also used to the oil lubrication system for bearing.

Mist lubrication system for bearing means the way of lubrication wherein the oil mist prepared by mist generator is supplied to the bearing with gas such as air to obtain smooth sliding. Recently, there are many machine tools using this system expecting its cooling effect by air for the high temperature portion such as bearing. The oil for mist lubrication system is required higher lubricity (for example, anti-wear and anti-seizure) in the portion of bearing sliding. Additionally, since this system is often used at high temperature, the oil is required high heat resistance property to prevent a thermal degradation. The oil of the present invention can be also used to the mist lubrication system for bearing.

Hydraulic system is a system which actuates and controls an apparatus by hydraulic pressure. In the hydraulic control section which governs the operation of the equipment, hydraulic working oil is used expecting the functions such as lubricating, sealing and cooling. The hydraulic working oil is required to possess the properties of the high lubricity (for example, anti-wear and anti-seizure), high oxidation stability and high thermal stability because the oil is compressed to high pressure by pump to generate the hydraulic pressure which operates the equipment. The oil of the present invention can be also used as the hydraulic working oil. When the oil of the present invention is used as hydraulic working oil as well as lubricating oil, the addition of the aforementioned phosphorus compounds and/or sulfur compounds are recommended to obtain further enhanced lubricity.

The term of gear portion means a mechanism driven by gear which is mainly installed in a gear cutting machine, and gear oil is used to slide the mechanism smoothly and to soften the metal-to-metal contact. Gear oil is required the high lubricity such as anti-wear and anti-seizure because high load is imposed on the sliding surface. The oil of the present invention can be also used as such gear oil. When the oil of the present invention is used as gear oil and lubricating oil at the same time, the addition of the aforementioned phosphorus compounds and/or sulfur compounds are recommended to obtain further enhanced lubricity.

Next, the method for cutting and grinding by minimal quantity lubrication system of the present invention is explained.

FIG. 1 illustrates an example of a machine tool preferably used in the present invention. The machine tool illustrated in FIG. 1 comprises a table 2 which is movable on a bed 1 in the direction shown by the arrow mark, and a tool 11 which is supported by a fixing means 10 and can rotate in the direction shown by the arrow mark. An oil supply tank 12 contains the oil of the present invention. When a workpiece 3 mounted on the table 2 is cut or ground, mist of the oil of the present invention is supplied to the machining portion through a machine oil supplier 13 together with compressed air provided by a feed line 18. The oil of the present invention contained in the tank 12 is supplied to the sliding surface between the bed 1 and the table 2 through a oil supply portion for sliding surface 14, and also supplied to a bearing between the fixing means 10 and the tool 11 through bearing oil supply portion 15 to lubricate a sliding surface 16 and a bearing 17.

Thus, in the method for cutting and grinding by minimal quantity lubrication system according to the present invention, the improvement of machinability and working efficiency in the minimal quantity lubrication system can be achieved by using the same oil which comprises esters to lubricate the cutting and grinding portions, sliding surfaces of machine tools, and furthermore bearings.

In addition, in the method for cutting and grinding by minimal quantity lubrication system of the present invention, as shown in FIG. 1, the space and energy saving of machine tools can be preferably achieved by using the same oil for cutting and grinding, sliding surface, and furthermore bearing because there is no need to install an independent tank for each oil supply.

In the method for cutting and grinding by minimal quantity lubrication system of the present invention, although not shown in FIG. 1, the oil of the present invention contained in the tank 12 may be used as a hydraulic working oil by supplying the oil to hydraulic units equipped with machine tools, and also the oil of the present invention contained in the tank 12 may be used as a gear oil to supply to a gear portion equipped with machine tools.

EXAMPLES

The following examples and comparative example further illustrate the detail of the present invention, but do not serve to limit the scope of the invention in any way.

Examples 1 to 12, Comparative Example 1

Oils of Examples 1 to 12 shown in Table 1 were prepared using the following substances; base oil, phosphorus compounds, sulfur compounds and antioxidant.

(Base Oil)
a: Triester of neopentylglycol and oleic acid
b: Triester of trimethylolpropane and oleic acid
c: Tetraester of trimethylolpropane and acid mixture of n-hexanic acid/n-octanic acid/n-decanic acid (mixing mole ratio=7:59:34)
d: Tetraester of pentaerythritol and n-octanic acid
e: Commercially available rapeseed oil
f: Monoester of glycerol and oleic acid
(Phosphorus Compounds)
g: Tricresylphosphate
(Sulfur Compounds)
h: Sulfide ester (Sulfur content: 9.9% by mass, inactive)
(Anti-Oxidant)
i: 2,6-di-tert-butyl-p-cresol Next, the following evaluation tests were carried out using the prepared oils. Note that the Comparative example 1 was evaluated in the tapping test for the case of only air blowing without oil, the result was also shown in Table 1.

(Evaluation of Anti-Stickiness)

5 ml of each oil was placed into an aluminum dish (100 mm×70 mm), and was allowed to stand in a constant temperature bath at 70° C. for 336 hours. The stickiness of each oils was then evaluated according to the five-grade scale by touching it with fingers. Before and after the test, the weight-average molecular weight of each composition was measured to examine the rate of change with GPC. The five-grade scale of stickiness is as follows.

A: not sticky at all
B: not sticky at all or extremely slightly sticky even though it is felt
C: slightly sticky
D: sticky
E: extremely sticky (Evaluation of Lubricity (Tapping Test))

Tapping test was conducted by alternately using each oil and a comparative standard oil (DIDA: diisodecyl adipate) under the following conditions.

Tapping Conditions
Tool: tap M8 (P=1.25 mm)
Hole diameter: φ47.2 mm
Workpiece: S25C (t=10 mm)
Cutting speed: 9.0 m/min
Oil Supply Method
Each oil: insufflated with compressed air of 0.2 MPa at a rate of 25 ml/h.
DIDA: insufflated directly to the work at a speed of 4.3 mL/min without using compressed air.

The tapping energy of each oil was measured, and then the tapping energy efficiency was obtained in accordance with the following equation.

Tapping energy efficiency (%)=(tapping energy when using DIDA)/(tapping energy when using the oil). Experimental results are shown in Table 1. In the Table 1, it means that when the tapping energy efficiency is higher, the higher lubricity is obtained.

(Properties Evaluation Test as Lubricating Oil for Sliding Surface)

Figure 2:
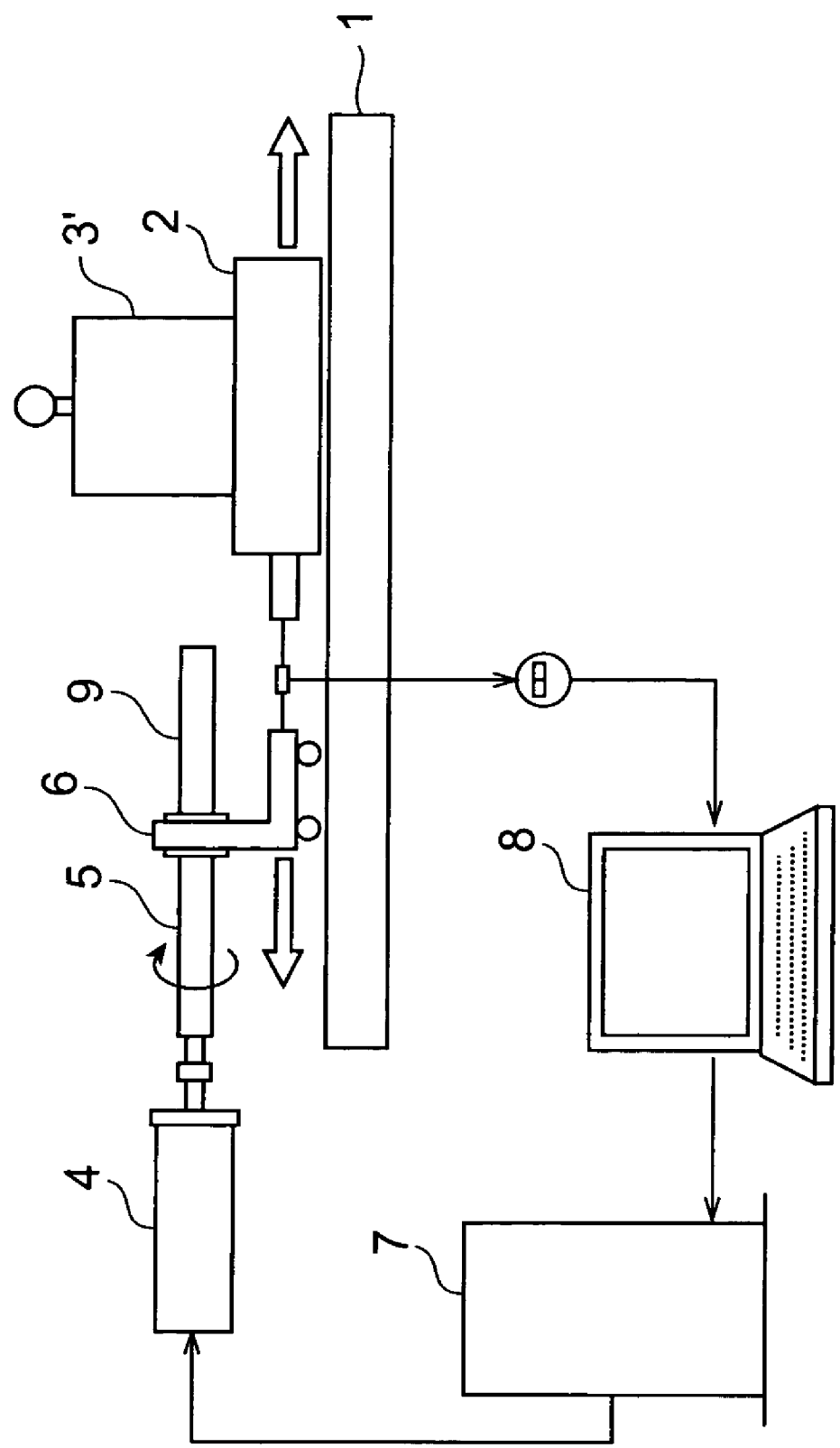
FIG. 2 shows an apparatus for a property evaluation test of oils with respect to the sliding surfaces in the present example.

The properties of each oil as a lubricating oil for sliding surface were evaluated by the following procedure using the apparatus shown in FIG. 2.

In FIG. 2, an oil was dropped on the contacting surfaces between a cast-iron bed 1 and a cast-iron table 2. The weight 3' was placed on the table 2 to apply a pressure of 200 kPa, then the table 2 was allowed to move reciprocally in the directions shown by arrow marks using a driving means which comprised an A/C servometer 4, a feed screw 5 and a movable jig 6 with a bearing. Using a control panel 7 and a control device 8, the reciprocal movement of the table 2 was conducted under the following conditions; feeding speed of 400 mm/min, feeding distance of 300 mm. After three reciprocal motions, a load between the table 2 and the movable jig 6 was measured with a load cell 9 at the fourth reciprocal motion. The average friction coefficient of contacting surfaces between the table and the bed (guiding surface) was calculated using the measurement values.

(Evaluation Test for Anti-wear)

By using high speed four balls method, the anti-wear of oils were evaluated by measuring diameters of wear scars at the rotation speed of 1800 rpm and the load of 390 N for 30 min. Results were shown in Table 1.

(Oxidation Stability Test)

A 25 ml of oil sample was poured into a 50 ml screw tube. After keeping at 70° C. for 4 weeks in air, the difference of the total acid value was measured. Results were shown in Table 1.

(Anti-seizure Test)

In accordance with ASTM D-2738-88, Loading Wear Indices (LWI) were determined at a rotation speed of 1800 rpm. Results were shown in Table 1. Note that the higher LWI means the superiority in anti-seizure.

method of cutting and grinding by minimal quantity lubrication system, and also suitable for lubrication of sliding surfaces. Accordingly, oil for cutting and grinding by minimal quantity lubrication system and method for cutting and grinding by minimal quantity lubrication system using the oil, which is provided by the present invention, are very useful for the improvement of machinability, working efficiency for cutting and grinding by minimal quantity lubrication system, and space and energy saving for machine tools.

TABLE 1

| | Example 1 | Example 2 | Example 3 | Example 4 | Example 5 | Example 6 | Example 7 | Example 8 | Example 9 | Example 10 | Example 11 | Example 12 | Comparative Example 1 |
|---|---|---|---|---|---|---|---|---|---|---|---|---|---|
| Component [% by mass] | | | | | | | | | | | | | |
| a | 50 | 48.5 | 49.75 | 48.25 | 47.25 | 47.25 | — | — | — | — | — | 45 | No oil is used. |
| b | 50 | 48.5 | 49.75 | 48.25 | 47.25 | 47.25 | 100 | 97 | — | — | — | 45 | |
| c | — | — | — | — | — | — | — | — | 100 | — | — | — | |
| d | — | — | — | — | — | — | — | — | — | 100 | — | — | |
| e | — | — | — | — | — | — | — | — | — | — | 100 | — | |
| f | — | — | — | — | — | — | — | — | — | — | — | 10 | |
| g | — | 3 | — | 3 | — | 2 | — | 3 | — | — | — | — | |
| h | — | — | — | — | 5 | 3 | — | — | — | — | — | — | |
| I | — | — | 0.5 | 0.5 | 0.5 | 0.5 | — | — | — | — | — | — | |
| Kinematic Viscosity (40° C.) [mm²/s] | 35 | 35 | 35 | 35 | 35 | 35 | 35 | 46 | 20 | 20 | 32 | 35 | — |
| Iodine Value | 81 | 80 | 81 | 81 | 82 | 81 | 81 | 85 | 0.2 | 1 | 114 | 81 | — |
| Bromine Value [gBr₂/100 g] | 52 | 52 | 51 | 52 | 50 | 52 | 52 | 56 | 0.1 | 1 | 73 | 52 | — |
| Hydroxyl Value [mgKOH/g] | 2.5 | 2 | 1.5 | 2.5 | 2.5 | 2 | 2 | 1.8 | 2 | 0.5 | 3 | 35 | — |
| Saponification Value [mgKOH/g] | 180 | 181 | 180 | 180 | 182 | 180 | 180 | 184 | 340 | 348 | 173 | 180 | — |
| Anti-stickiness | C | C | A | A | A | A | C | C | B | A | D | C | — |
| Tapping Energy Efficiency [%] | 98 | 110 | 98 | 111 | 109 | 115 | 98 | 110 | 94 | 94 | 90 | 103 | 80 |
| Average Friction Coefficient | 0.145 | 0.131 | 0.146 | 0.132 | 0.133 | 0.13 | 0.147 | 0.133 | 0.147 | 0.144 | 0.147 | 0.138 | — |
| Diameter of Wear Scar [μm] | 0.70 | 0.60 | 0.61 | 0.61 | 0.61 | 0.58 | 0.71 | 0.61 | 0.69 | 0.69 | 0.75 | 0.58 | — |
| Difference of Total Acid Value [mgKOH/g] | 0.21 | 0.18 | 0.02 | 0.01 | 0.03 | 0.01 | 0.25 | 0.22 | 0.10 | 0.11 | 0.29 | 0.24 | — |
| LWI [N] | 220 | 305 | 215 | 310 | 305 | 320 | 230 | 320 | 220 | 225 | 215 | 285 | — |

Referring to Table 1, the high performance of tapping, anti-sticking property and friction property of oils of Examples 1 to 12 lead to a conclusion that these oils are superior as an oil for cutting and grinding by minimal quantity lubrication system, and also superior as a lubricating oil for sliding surface. Furthermore, the high performance of anti-wear, anti-seizure and oxidation stability of oils of Examples 1 to 12 also ensure that these oils are superior as both a lubricating oil for bearings and a hydraulic working oil, and the high performance of anti-wear and anti-seizure of oils also ensure that these oils are superior as a gear oil. Among these examples, Examples 3 to 6, 9 and 10 showed the higher resistance to stickiness.

INDUSTRIAL APPLICABILITY

As mentioned above, the oil for cutting and grinding by minimal quantity lubrication system and for sliding surface, which is provided by the present invention, is suitable for the

The invention claimed is:

1. A method for cutting and grinding a workpiece by minimal quantity lubrication system, comprising:
    cutting and grinding using a first oil for the cutting and grinding, said first oil consisting of a first ester which is an ester of at least one polyhydric alcohol selected from neopentyl glycol, trimethylolethane, and trimethylolpropane, and at least one monobasic acid selected from fatty acids having 2 to 24 carbon atoms, and optionally at least one additive selected from phosphorus compounds, sulfur compounds, antioxidants, oiliness improvers, metal passivators and extreme pressure additives with the exception of the phosphorus compounds and the sulfur compounds, wherein the content of said first ester is 30% to 100% by mass based on the total amount of said first oil, and
    sliding surfaces using a second oil for the sliding surfaces, said second oil consisting of a second ester which is the same ester as said first ester, and optionally at least one additive selected from phosphorus compounds, sulfur compounds, antioxidants, oiliness improvers, metal deactivators and extreme pressure additives with the exception of the phosphorus compounds and the sulfur compounds, wherein the content of said second ester being 30% to 100% by mass based on the total amount of said second oil, wherein the phosphorus compounds used for the first oil are compounds selected from the group consisting of phosphate ester, acid phosphate ester, acid phosphate ester amine salt, chlorinated phosphate ester, phosphite ester, and phosphorothionate;

wherein the phosphorus compounds used for the second oil are compounds selected from the group consisting of phosphate ester, acid phosphate ester, acid phosphate ester amine salt, chlorinated phosphate ester, phosphite ester, and phosphorothionate; and wherein the first oil and the second oil are the same oil.

2. A method according to claim 1, wherein the phosphate ester is selected from the group consisting of tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate, and xylenyldiphenyl phosphate.

3. A method according to claim 1, wherein the acid phosphate ester is selected from the group consisting of monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

4. A method according to claim 1, wherein the acid phosphate ester amine salt consists of an amine salt of the acid phosphate ester, wherein the amine is selected from the group consisting of methylamine, propylamine, butylamine, pentylamine, hexylamine, heptylamine, octylamine, dimethylamine, dipropylamine, dibutylamine, dipentylamine, dihexylamine, diheptylamine, dioctylamine, trimethylamine, tripropylamine, tributylamine, tripentylamine, trihexylamine, triheptylamine, and trioctylamine.

5. A method according to claim 1, wherein the chlorinated phosphate ester is selected from the group consisting of tris-dichloroprorylphosphate, trischloroethylphosphate, trischlorophenylphosphate, and polyoxyalkylenebis[di(chloroalkyl)]phosphate.

6. A method according to claim 1, wherein the phosphite ester is selected from the group consisting of dibutylphosphite, dipentylphosphite, dihexylphosphite, diheptylphosphite, dioctylphosphite, dinonylphosphite, didecylphosphite, diundecylphosphite, didodecylphosphite, dioleylphosphite, diphenylphosphite, dicresylphosphite, tributylphosphite, tripentylphosphite, trihexylphosphite, triheptylphosphite, trioctylphosphite, trinonylphosphite, tridecylphosphite, triundecylphosphite, tridodecylphosphite, trioleylphosphite, triphenylphosphite, and tricresylphosphite.

7. A method according to claim 1, wherein the phosphorothionate is selected from the group consisting of tributylphosphorothionate, tripentylphosphorothionate, trihexylphosphorothionate, triheptylphosphorothionate, trioctylphosphorothionate, trinonylphosphorothionate, tridecylphosphorothionate, triundecylphosphorothionate, tridodecylphosphorothionate, tritridecylphosphorothionate, tritetradecylphosphorothionate, tripentadecylphosphorothionate, trihexadecylphosphorothionate, triheptadecylphosphorothionate, trioctadecylphosphorothionate, trioleylphosphorothionate, triphenylphosphorothionate, tricresylphosphorothionate, trixylenylphosphorothionate, cresyldiphenylphosphorothionate, xylenyldiphenylphosphorothionate, tris(n-propylphenyl)phosphorothionate, tris(isopropylphenyl)phosphorothionate, tris(n-butylphenyl)phosphorothionate, tris(isobutylphenyl)phosphorothionate, tris(s-butylphenyl)phosphorothionate, and tris(t-butylphenyl)phosphorothionate.

* * * * *